INVENTOR
Luigi Maiocchi

United States Patent Office 3,157,216
Patented Nov. 17, 1964

3,157,216
PNEUMATIC TIRES OF THE REPLACEABLE
TREAD TYPE
Luigi Maiocchi, Milan, Italy, assignor to
Pirelli S.p.A., Milan, Italy
Filed Jan. 10, 1963, Ser. No. 250,552
Claims priority, application Italy Jan. 25, 1962
4 Claims. (Cl. 152—176)

The present invention relates to pneumatic tires of the so-called "replaceable tread" type; namely, to pneumatic tires constituted by a tread ring and by a carcass upon which the tread ring is assembled.

Pneumatic tires of this kind, wherein the tread becomes secured to the carcass by reason of friction forces which are originated between the two parts when the tire is inflated, are well known. In order to obtain this result, the tread ring is inwardly provided with a reinforcement which renders it inextensible in the circumferential direction, such reinforcement having an inner diameter less than the outer diameter the carcass would assume if it were inflated devoid of the tread ring.

In the pneumatic tires of the above indicated type, the carcass is often provided with a breaker structure placed in proximity of the outer peripheral surface. The breaker structure is usually constituted by one or more strips, preferably two, generally made of metallic cords parallel to one another in each layer and inclined with respect to the circumferential direction at an angle usually ranging between 40° and 70°.

In the pneumatic tires of this kind, namely in those tires in which the fastening of the tread ring to the carcass is effected by the friction forces due to the inflation pressure, such forces are sufficient to ensure the perfect joining between the two component parts of the tire, whereby the mating or contacting surfaces of the carcass and the tread ring may be perfectly smooth and cylindrical. However, by experiment it has been ascertained that remarkable advantages are attained if the contacting surfaces are provided with longitudinal channels and projections complementary in the two parts of the tire, since this expedient permits a perfect centering of the tread ring during its assembling on the carcass and moreover prevents, during the travelling of the vehicle, such repeated transversal stresses in the same direction as may cause a lateral displacement of the tread ring, even though slight.

However, the provision of the projections and of the channels requires the utilization, between the breaker structure and the reinforcement of the tread, of a rubber layer having a thickness at least equal to the depth of the channels, as illustrated by FIG. 1. It has been found that this rubber layer presents some problems. For example, during the running of the tire, the rubber layer disposed between the resistant structures of the carcass and of the tread ring causes a high development of heat in a very delicate part of the tire and a resultant shortening of the tire life. Also, the weight of the tire is markedly increased, together with its cost.

The aim of the present invention is that of providing a pneumatic tire of the replaceable tread type provided with the above indicated channels and projections and devoid of the previously noted problems.

Briefly summarized, the present invention comprises a pneumatic tire of the replaceable tread type, consisting of a tread ring provided with an inextensible reinforcing structure and a carcass having a breaker structure, and characterized in that on the surface of the carcass, in the zone intended to make contact with the tread ring, two longitudinal channels are provided, symmetrical with respect to the mid-circumferential plane and defining a central smooth portion having a width at least equal to that of the radially outermost breaker strip and in that the inner surface of the tread ring has a profile complementary to that of the carcass. Thus, the breaker structure, or its outermost strip, is disposed between the two longitudinal downward projections of the inner surface of the tread ring when the latter is assembled on the carcass. As a consequence, the resistant structures of the two parts constituting the tire can therefore be moved toward each other the desired degree. This enables the thickness of the rubber layer to be reduced to eliminate the above mentioned problems.

While the depth of the channels will depend upon the size of the tire and the probable extent of the stresses to which the tire will be submitted, in general, the depth can be substantially less than that required for prior art pneumatic tires. This, because the portion of the carcass, which is inserted between the projections of the inner surface of the tread is reinforced by the breaker structure and therefore is less deformable in the transversal direction than it would be if it were constituted of rubber only.

The present invention moreover provides the additional advantage that the two longitudinal projections of the vulcanizing mold intended to impress the two above indicated mating channels in the carcass prevent displacement of the breaker structure during the molding and vulcanizing operations, so that it is possible to produce a carcass in which the breaker structure is perfectly centered.

According to an embodiment of the invention the longitudinal channels in the carcass are provided at the sides of the outermost strip of the breaker structure, and in this case the depths of the channels is preferably no greater than the thickness of a single breaker strip, the word "thickness" meaning in this case the thickness of the layer of parallel rubberized cords in addition to the thickness of the rubber sheet which is superposed to the assembly in order to constitute the outer surface of the carcass. In other words, the lateral or transverse reach of the outermost strip of the breaker structure is wholly confined within the central portion defined by the longitudinally extending annular channels.

According to another embodiment of the invention, the longitudinal channels on the carcass are provided at the sides of the entire breaker structure, and in this case the depth is preferably no greater than the thickness of said breaker structure, the thickness of the rubber sheet which constitutes the outer surface of the carcass being comprised also in this instance. This is to say, that the lateral or transverse reach of the entire breaker structure is wholly confined within the central portion of the carcass defined by the longitudinally extending channels.

Referring to the invention in greater detail, with reference to the attached drawings, given by way of nonlimiting example, wherein like reference numerals represent like parts throughout the several views.

Figure 1:
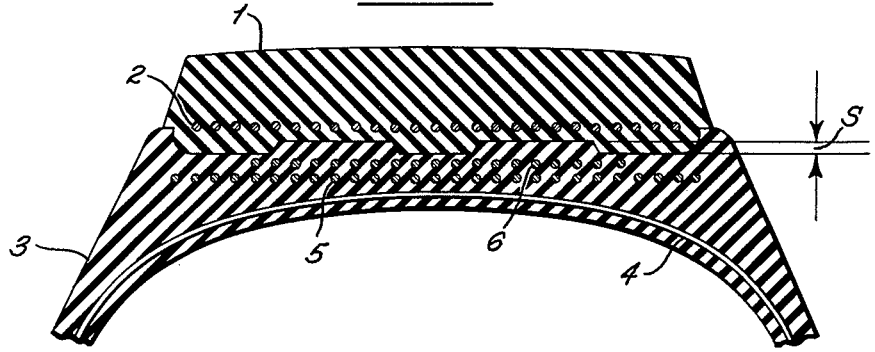
FIG. 1 is a cross section of a pneumatic tire of a type well known in the art.

In FIG. 1, the reference numeral 1 indicates the tread ring which is provided with an inextensible reinforcement 2. Tread ring 1 is assembled on the carcass 3 which is provided with a breaker structure constituted by two strips 5 and 6. The carcass and the tread ring have, in a way already known, a coupling profile constituted by a series of longitudinal grooves and channels, so that it is necessary to dispose the breaker strips 5 and 6 at a certain distance from the reinforcement 2, equal at least to the depth $s$ of the channels.

Figure 2:
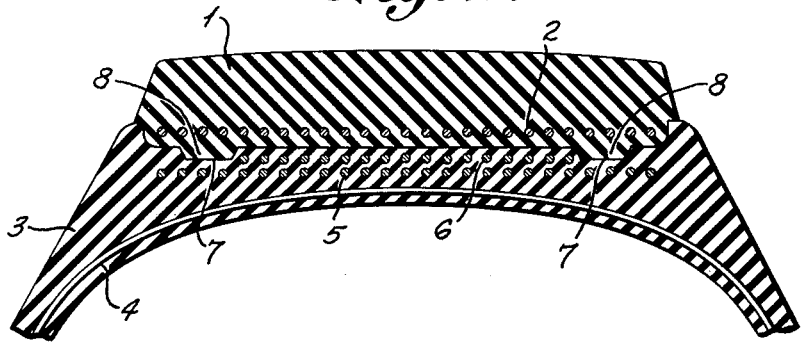
FIG. 2 is a cross section of a pneumatic tire incorporating an embodiment of the present invention.

FIG. 2 illustrates a pneumatic tire according to the present invention, consisting of a tread ring 1 provided with a reinforcement 2 and by a carcass 3 provided with a breaker structure formed by two strips 5 and 6. Situated beyond the transverse reach of the outer strip 5 there are two longitudinal channels 7, whereas on the inner surface of the tread ring there are two longitudinal projections 8 intended to nest within channels 7. The strip 5 of the breaker structure is therefore positioned between the projections 8 and consequently the breaker structure and the reinforcement 2 are disposed in closer proximity as compared to the corresponding components in the tire of FIG. 1.

Figure 3:
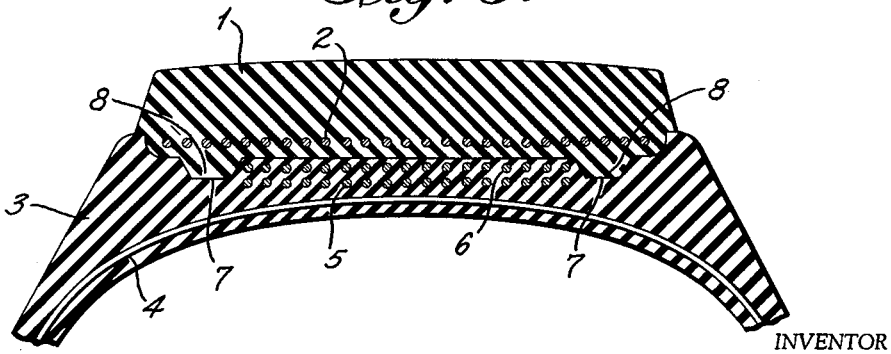
FIG. 3 is a cross section of a pneumatic tire according to a further embodiment of the present invention.

FIG. 3 represents a pneumatic tire similar to that shown in FIG. 2, the only difference being that the parallel channels 7 are each disposed beyond the transverse reach of the entire breaker structure constituted by the strips 5 and 6, so that said whole structure is disposed inwardly of the projections 8.

It is understood that the above cited examples have a nonlimiting character and that the present invention includes any other alternative form of realization deriving from the inventive concept.

What is claimed is:

1. A pneumatic tire having a replaceable tread consisting of a tread ring provided with an inextensible reinforcing structure and a carcass embodying a breaker structure comprising a plurality of breaker strips characterized in that on the outer surface of the carcass, in the zone adapted to contact said tread ring, there are substantially parallel longitudinally extending annular channels, symmetrical with respect to the mid-circumferential plane, said channels defining a central smooth portion having a width at least equal to the width of the radially outermost breaker strip, and in that the inner surface of the tread ring has a profile complementary to that of the carrying casing said radially outermost breaker strip being wholly confined within said central smooth portion between said channels.

2. A pneumatic tire as in claim 1, characterized in that the depth of the channels provided in said carcass is no greater than the thickness of the outermost breaker strip.

3. A pneumatic tire as in claim 1, characterized in that the width of the central smooth portion of said carcass is equal to the total width of the breaker structure said breaker structure being wholly confined within said central portion between said channels.

4. A pneumatic tire as in claim 3, characterized in that the depth of the channels provided in said carcass is no greater than the total thickness of the breaker structure.

References Cited in the file of this patent

UNITED STATES PATENTS 2,985,214    Lugli _____ May 23, 1961

FOREIGN PATENTS 545,860    Italy _____ July 6, 1956
801,146    Great Britain _____ Sept. 10, 1958